(12) United States Patent
Skramstad

(10) Patent No.: US 8,941,708 B2
(45) Date of Patent: Jan. 27, 2015

(54) METHOD, COMPUTER-READABLE STORAGE MEDIUM, AND APPARATUS FOR MODIFYING THE LAYOUT USED BY A VIDEO COMPOSING UNIT TO GENERATE A COMPOSITE VIDEO SIGNAL

(75) Inventor: Hakon Skramstad, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 200 days.

(21) Appl. No.: 13/560,767

(22) Filed: Jul. 27, 2012

(65) Prior Publication Data

US 2013/0027502 A1    Jan. 31, 2013

Related U.S. Application Data

(60) Provisional application No. 61/513,190, filed on Jul. 29, 2011.

(51) Int. Cl.
  *H04N 7/14* (2006.01)
  *H04N 7/15* (2006.01)

(52) U.S. Cl.
  CPC ....................... *H04N 7/15* (2013.01)
  USPC ........................ 348/14.01; 38/14.08; 38/14.09

(58) Field of Classification Search
  CPC ............. H04N 7/15; H04N 7/14; H04N 9/67; H04N 7/152; H04N 7/142
  USPC .............................. 348/14.01–14.16; 715/765
  See application file for complete search history.

(56) References Cited

U.S. PATENT DOCUMENTS

| | | | |
|---|---|---|---|
| 7,321,384 B1 | 1/2008 | Wu et al. | |
| 7,634,540 B2 * | 12/2009 | Ivashin et al. | 709/204 |
| 2007/0211141 A1 | 9/2007 | Christiansen | |
| 2008/0068449 A1 | 3/2008 | Wu et al. | |
| 2008/0316295 A1 | 12/2008 | King et al. | |
| 2008/0316296 A1 | 12/2008 | King et al. | |
| 2008/0316297 A1 | 12/2008 | King et al. | |
| 2008/0316298 A1 | 12/2008 | King et al. | |
| 2010/0103245 A1 | 4/2010 | Decker et al. | |
| 2010/0333004 A1 * | 12/2010 | Kristiansen et al. | 715/765 |
| 2011/0043600 A1 | 2/2011 | Gopal et al. | |
| 2011/0115876 A1 | 5/2011 | Khot et al. | |
| 2011/0205333 A1 | 8/2011 | Wu et al. | |

(Continued)

FOREIGN PATENT DOCUMENTS

| | | |
|---|---|---|
| EP | 1 868 348 A2 | 12/2007 |
| EP | 1 868 348 A3 | 12/2007 |
| EP | 2 288 104 A1 | 2/2011 |

(Continued)

OTHER PUBLICATIONS

International Search Report and Written Opinion issued Jan. 22, 2013, in PCT/US2012/048594 filed Jul. 27, 2012.

*Primary Examiner* — Melur Ramakrishnaiah

(74) *Attorney, Agent, or Firm* — Lempia Summerfield Katz LLC

(57) ABSTRACT

In one embodiment, a method that includes providing, on a display, an object configured to be moved by a user along an axis, associating a plurality of predefined layouts with respective intervals along the axis, detecting a user action on the object indicating a position on the axis, and composing, in response to the detecting of the user action, a composite video signal using a layout, of the plurality of predefined layouts, associated with an interval among the intervals within which the position is lying.

19 Claims, 7 Drawing Sheets

(56) References Cited

U.S. PATENT DOCUMENTS

2012/0200661 A1* 8/2012 Mock .................... 348/14.09
2012/0327182 A1 12/2012 King et al.

FOREIGN PATENT DOCUMENTS

WO    WO 2007/103412 A2    9/2007
WO    WO 2007/103412 A3    9/2007

* cited by examiner

METHOD, COMPUTER-READABLE STORAGE MEDIUM, AND APPARATUS FOR MODIFYING THE LAYOUT USED BY A VIDEO COMPOSING UNIT TO GENERATE A COMPOSITE VIDEO SIGNAL

CROSS-REFERENCE TO RELATED APPLICATIONS

The present application claims the benefit of U.S. Provisional Patent Application No. 61/513,190, filed Jul. 29, 2011, the entire subject matter of which is incorporated herein by reference.

BACKGROUND

1. Technological Field

The present disclosure relates generally to a method, computer-readable storage medium, and apparatus that modify the layout used by a video composing unit to generate a composite video signal.

2. Background

Videoconferencing systems comprise a number of endpoints communicating real-time video, audio and/or data (often referred to as Duo Video) streams over and between various networks such as Wide Area Network (WAN), Local Area Network (LAN), and circuit switched networks.

Today, users of technical installation are accustomed to and demand systems which are easy to use and provide flexibility in ways of customization of graphical environments and collaboration between devices. Traditional video conferencing systems are not very flexible. For example, regardless of a layout selected by a user when initiating a continuous presence and/or a Duo Video call, the positions and sizes of the different video and/or data stream is beyond the user's control. Further, traditional video conferencing systems are operated using on-screen menu systems controlled by a keypad on an infrared (IR) remote control device, allowing for limited flexibility and cumbersome user experience.

BRIEF DESCRIPTION OF THE FIGURES

The disclosure will be better understood from reading the description which follows and from examining the accompanying figures. These figures are provided solely as non-limiting examples of the embodiments. In the drawings.

DESCRIPTION OF EXAMPLE EMBODIMENTS

Overview

Figure 1:
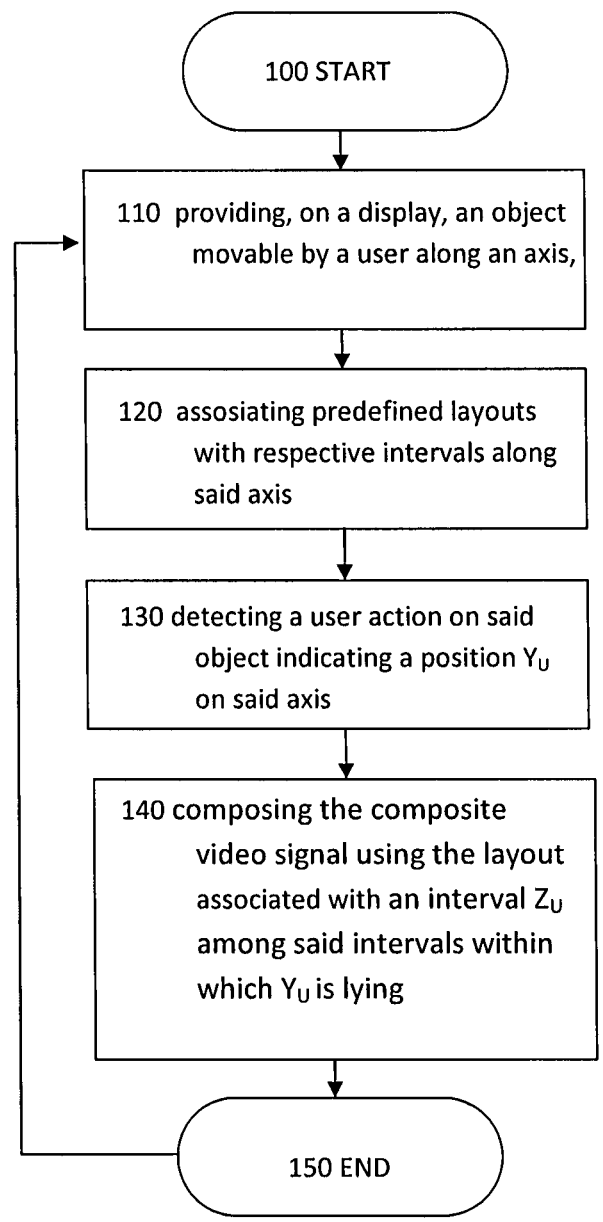
FIG. 1 is a flow chart illustrating a method of the present disclosure for generating a composite video signal.

In one embodiment, a method that includes providing, on a display, an object configured to be moved by a user along an axis, and associating a plurality of predefined layouts with respective intervals along the axis. The method further includes detecting a user action on the object indicating a position on the axis, and composing, in response to the detecting of the user action, a composite video signal using a layout, of the plurality of predefined layouts, associated with an interval among the intervals within which the position is lying.

Detailed Description

Videoconferencing systems comprise a number of endpoints communicating real-time video, audio and/or data (often referred to as Duo Video) streams over and between various networks. A number of videoconference systems residing at different sites may participate in the same conference, most often, through one or more Multipoint Control Unit(s) (MCUs) performing, e.g., switching and mixing functions to allow the audiovisual terminals to intercommunicate properly.

An MCU may be a stand alone device operating as a central network recourse, or could be integrated in the codec of a video conferencing system. An MCU links the sites (where the videoconference systems reside) together by receiving frames of conference signals from the sites, processing the received signals, and retransmitting the processed signals to appropriate sites.

In a continuous presence conference, video signals and/or data signals from two or more sites are spatially mixed to form a composite video signal that is to be viewed by conference participants. The composite video signal is a combined video signal that may include live video streams, still images, menus, or other visual images from participants in the conference. There are an unlimited number of possibilities of how the different video and/or data signals are spatially mixed, e.g., size and position of the different video and data frames in the composite image. A codec and/or MCU have a set of preconfigured composite video signal templates stored on the MCU or video conference codec allocating one or more regions (frames) within a composite video signal for one or more video and/or data streams received by the MCU or codec. These templates may also be referred to as layouts.

The present disclosure associates a set of layouts (or image composition types) that support important scenarios, and enables a user to move between layouts (or image composition types) seamlessly by manipulating an object across a continuum. This facilitates controlling the relative size between the media object that is currently in focus (e.g., active speaker or presentation) and the remaining media objects.

The term "site" is used to refer collectively to a location having an audiovisual endpoint and a conference participant or user, or simply to an endpoint.

The term "composite video signal" is used to refer collectively to a video signal being a spatial mix of one or more video conference streams.

The term "video composing unit" is used to refer collectively to a device or software running on a processing device configured to receive a number, P, of video conference streams and mix the streams together into one or more composite video streams, and output the one or more composite video streams to one or more endpoints. The position and size of a video conference stream in the composite video signal is dependent upon the layout used by the video composing unit. A non-limiting example of a video composing unit is a Multipoint Control Unit (MCU).

The term "endpoint" is used to refer collectively to a video conference endpoint or terminal (such as a personal endpoint, a meeting room endpoint, an auditorium endpoint, etc.), or a software application running on a personal computer facilitating audiovisual communication with other endpoints.

The term "video conference streams" is used to refer collectively to multimedia streams originating from an endpoint, e.g., video streams, audio streams, images, multimedia from a secondary device connected to the endpoint (such as a computer or a Digital Versatile Disc (DVD) player).

The term "layout" is used to refer collectively to a template, or anything that determines or serves as a pattern, for defining the composition of a composite video signal. According to one embodiment of the present disclosure, a layout is a configuration file, e.g., an XML document, defining the position and size of all the video conference streams in the composite video signal. An exemplary layout or configuration file according to one embodiment of the present disclosure may be represented as follows:

```
<video>
    <layout>
        <frame item=1>
            <PositionX>10000</PositionX>
            <PositionY>10000</PositionY>
            <Width>4084</Width>
            <Height>4084</Height>
            <VideoSourceId>1</VideoSourceId>
        <frame item=2>
            <PositionX>5000</PositionX>
            <PositionY>5000</PositionY>
            <Width>4084</Width>
            <Height>4084</Height>
            <VideoSourceId>2</VideoSourceId>
```

Video conference streams from two or more sites are spatially mixed to form a composite video signal. The area occupied by a video conference stream is referred to as a frame. When the video composing unit mixes the video conference signals, the video composing unit needs to know the exact position and size of each frame. Therefore, the layout or configuration file, at least, defines the position, size, and an ID identifying the video conference stream source, for each frame.

Referring to the layout or configuration file above, the <position> of the different frames in the composite video signal is given in top left coordinates. The <Width> and <Height> define the size of the frame in pixel values. The <VideoSourceId> relates to the video conference stream source that should be displayed in a frame.

The present disclosure relates to a method and endpoint for modifying the layout used by a video composing unit to generate a composite video signal (e.g., Duo Video or continuous presence video conference). The method and endpoint according to the present disclosure provides to the user an object on a display, wherein the object is configured to be moved by a user along an axis or continuous line. The method and endpoint associates layouts (or compositions) that support important scenarios to intervals along the continuous line, and enables a user to move between the layouts (or compositions) seamlessly by manipulating the object across the continuous line. The continuous line is only an example. The axis need not be a line nor be continuous. The axis may be an arc, a circle, and/or discontinuous.

One end of the continuous line is associated with a selected layout, e.g., only the loudest speaker is shown in full screen. The other end of the continuum is associated with another layout, e.g., all video conference streams are distributed in approximately equal size across one or more screens. There may also be other layouts associated with intermediate intervals. The movable object may be displayed on the endpoint's main display together with the composite video signal, or the object may be displayed on a separate control device (such as a touch screen remote control) together with a replica of the current video composition (layout).

Since an exemplary embodiment involves manipulating a single axis of control, the exemplary embodiment may be suitable for various user input mechanisms, such as a traditional remote control (would require a user selectable mode for controlling layout composition), mouse, and touch screens. Furthermore, other embodiment may incorporate multiple axes of control.

FIG. 1 is a schematic flow chart illustrating an exemplary method for generating a composite video signal to be displayed on an endpoint display. The method starts at the initiating step 100. An object movable by a user along an axis or continuous line is provided on a display in the providing step 110.

Figure 2:
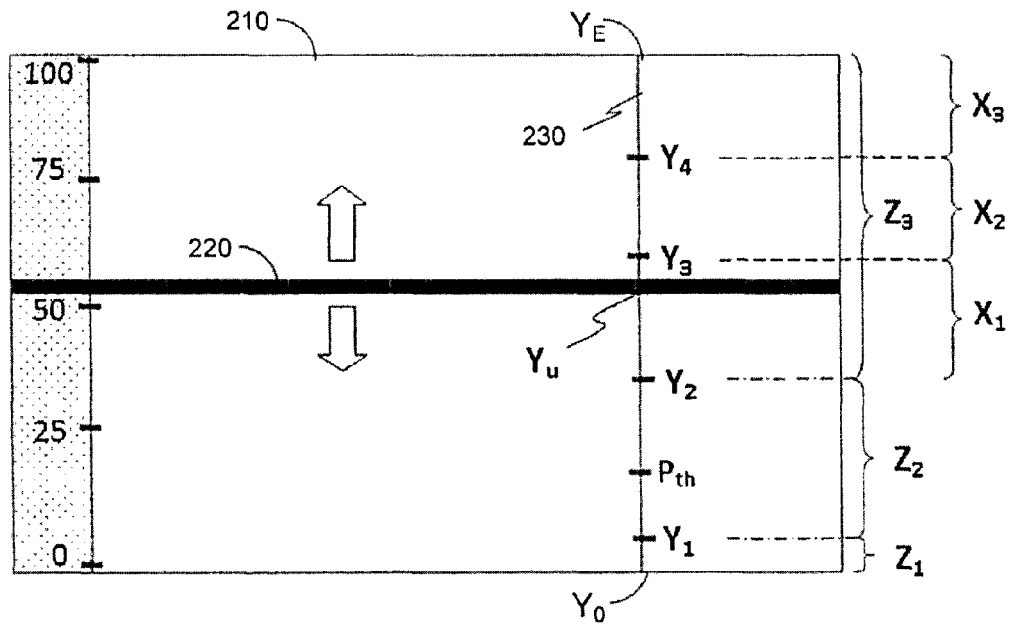
FIG. 2 shows a display area or area of a display for displaying the composite video signal.

FIG. 2 is a schematic diagram for illustrating the features of the present disclosure, and shows a display area or area of a display for displaying the composite video signal 210. An exemplary object 220 is displayed, wherein the object 220 is movable along an axis 230, as indicated by the arrows shown in FIG. 2. In one embodiment, the axis 230 is not visible to the user.

In one embodiment, the object 220 is provided on a main display associated with the endpoint, wherein the display is used for displaying video conference streams, such as a composite video signal, to the local user. The object 220 may be displayed together with the composite video signal. In one embodiment, the object 220 may be displayed as an overlay over the composite video signal. In another embodiment, the object 220 may be displayed in an area separated from the composite video signal. In another embodiment, the object 220 may be provided on a display of a control device associated with the endpoint.

The control device is a device that comprises, at least, a display, input device, a memory, and a processor. The display device may be a dedicated remote control device, a mobile unit (such as a mobile phone, tablet device, etc.) or a personal computer (PC). The display and input device may be the same device, such as a touch display. The display device is connected to the endpoint via a wired (e.g., LAN or cable to endpoint) or wireless (e.g. Wi-Fi, Bluetooth®, etc.) communication network.

A client application running on the display device is configured to communicate with the endpoint, to send control signals to the endpoint and receive control signals from the endpoint. According to one embodiment of the present disclosure, the client application receives control signals in the form of layout information from the endpoint, and, based on this layout information, the control unit renders and displays a replica of the current composite video signal displayed on the main display associated with the endpoint. Furthermore, the composite video signal and/or the replica may be updated in real time as the object 220 is moved by the user.

The layout information may e.g., be the layout currently being used, names of participants and/or endpoint, and in which frame their video conference streams are displayed, etc. The object 220 may be displayed together with the replica. In one embodiment, the object 220 may be displayed as an overlay over the replica. In another embodiment, the object 220 may be displayed in an area separated from the replica.

The object 220 may be a solid graphical object, or the object 220 may be partly or totally transparent. The object 220 may have any shape, size, or form. In one embodiment, the object 220 may be a line or bar stretching partly or totally across the display area or the displayed composite video signal. The object 220 may appear in response to a user action, e.g., activating a layout control function via a menu system or pushing a button on a remote control, or a user touching a touch screen display.

The term "axis" is used collectively to describe a continuous or discontinuous line, having a start value, an end value, and a number of intermediate values. In one embodiment, the line is preferably linear. However, the line may have any shape or be an arc or circle. In one embodiment, the axis or continuous line is preferably positioned in alignment with vertical or horizontal parts of the display or the displayed composite video signal. However, it should be understood that the axis or continuous line may be positioned in many ways.

In one embodiment of the present disclosure, the axis 230 has a starting position $Y_0$ at one edge of a display or a displayed composite video signal, and an end position $Y_E$ at an opposite edge of the display or displayed composite video signal, as shown in FIG. 2. In another embodiment, the axis 230 has a starting and end position different from the edges of the display or displayed composite video signal.

In one embodiment, the object 220 and axis 230 are represented by a track bar or slider. A track bar or slider is a control used to slide a small bar or pointer (also called a thumb), along a continuous line. To use the track bar, a user can drag the thumb in one of two directions using an input device. This changes the position of the thumb. The user can also click a position along the control line to place the thumb at a desired location. Alternatively, when the track bar has focus, the user can use arrow keys to move the thumb. A track bar is configured with a set of values from a minimum to a maximum. Therefore, the user can make a selection included in that range.

Next, returning to FIG. 1, in the associating step 120, a plurality (N) of predefined layout types is associated with (N) respective intervals $Z_N$ along the axis or continuous line 230. For example, a "show only one participant in full screen (FOCUS)" layout may be associated with a first interval $Z_1$, a "show one participant in full screen and a number of other participants in small frames (FOCUS+PRESENCE)" layout may be associated with a second interval $Z_2$, and a "show all video conference streams in equal size (OVERVIEW)" layout type may be associated with a third interval $Z_3$. In one embodiment, the axis or continuous line 230 (having a start position $Y_0$ and an end position $Y_E$, as shown in FIG. 2) has a plurality (N) of intervals $Z_n$. A predefined layout is associated with a respective interval $Z_n$. In one embodiment, the intervals $Z_n$ may be separated by a set of threshold positions $Y_n$ on the axis or continuous line 230, wherein n=N−1 and 0<n<N and $Y_0 < Y_n < Y_E$. The threshold positions provide N numbers of intervals $Z_0 = [Y_0, Y_1], Z_n = [Y_n, Y_{n+1}], \ldots Z_N = [Y_{N-1}, Y_E]$. Each interval is associated with a respective one of N numbers of predefined layouts. In one embodiment, the threshold positions $Y_n$ are configurable by a user via a graphical user interface or setting menu.

Figure 7:
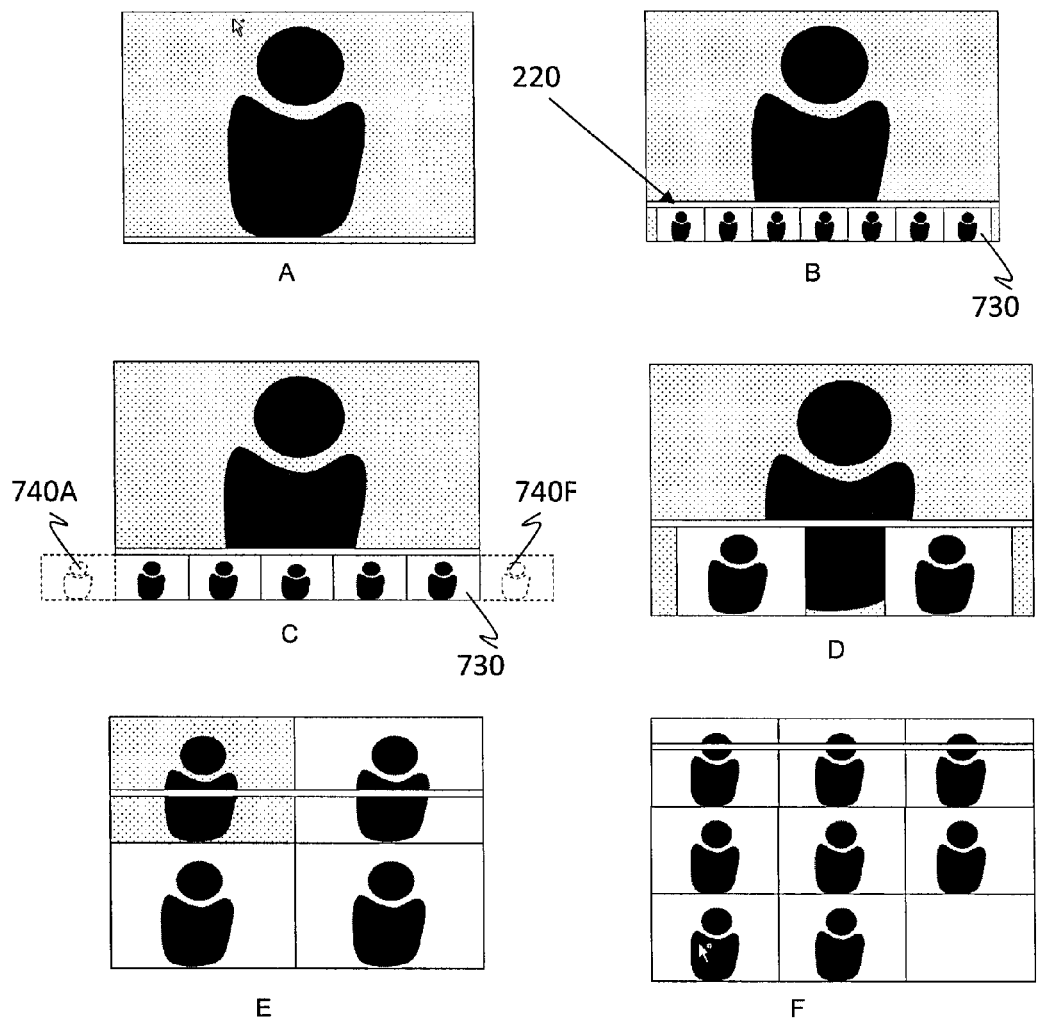
FIG. 7 illustrates display area(s) according to one embodiment of the present disclosure.

According to one embodiment of the present disclosure, for one or more of the intervals $Z_N$, there is provided a relationship between the positions Y within an interval $Z_N$ and the size of the respective frames within a layout associated with the interval $Z_N$. In other words, the size and/or position of one or more of the frames in a layout type is a function of the user selected position $Y_u$. According to this embodiment, in response to detecting a user action indicating a layout position $Y_u$, the size and position of each frame of the layout type is calculated based on the relationship and the layout position $Y_u$. For example, if a user selected position $Y_u$ is within an interval associated with a FOCUS+PRESENCE layout (example of which is shown in FIGS. 7B-7D), the size and/or position of the frames comprising video conference streams from the sites not in FOCUS is dependent on the position $Y_u$.

According to another embodiment, the associating step 120 further comprises associating a plurality (M) of variations of a layout with M number of sub-intervals ($X_M$). The plurality of variations of a layout type may be associated within one or more of the intervals $Z_N$. The variations of a layout type are variations of the layout type associated with an interval $Z_N$. A "show all video conference streams in equal size (OVERVIEW)" layout type may e.g., be associated with an interval $Z_3$. A 2×2 frame variation of the OVERVIEW layout (shown in FIG. 7E) may e.g., be associated with a first sub-interval $X_1$ of interval $Z_3$. A 3×3 frame variation of the OVERVIEW layout (shown in FIG. 7F) may e.g., be associated with a second sub-interval $X_2$ of interval $Z_3$, and a 4×4 frame variation of the OVERVIEW layout may e.g., be associated with a third sub-interval $X_3$ of interval $Z_3$.

Next, returning to FIG. 1, in the detecting a user action step 130, a user action on the object 220 indicating a position $Y_u$ on the axis is detected. In one embodiment, the user action is a user moving the object 220 along the axis 230. The user may move the object 220 using an input device, such as a mouse, a keyboard, buttons on a remote control, touch screen, etc.

In another embodiment, the user action is a user selecting a position along the axis 230. The user may select a position along the axis 230 using an input device, such as a mouse, a keyboard, buttons on a remote control, touch screen, etc. The object will move to the selected position.

Next, in the composing step 140, the composite video signal is composed using the layout associated with an interval $Z_u$ among the intervals within which $Y_u$ is lying. At step 150, the processing ends.

In one embodiment of the present disclosure, the composing step 140 further comprises the step of identifying, in response to detecting the user action, an interval $Z_u$ among the intervals $Z_N$ within which $Y_u$ is lying, and selecting a layout type associated with the interval $Z_U$. The composite video signal is composed using the selected layout type.

In one embodiment, the composing step 140 comprises selecting a predefined layout representing the selected layout, and sending the default layout to a video composing unit.

In another embodiment, the composing step 140 comprises generating or calculating a layout, wherein the layout parameters defining the size and position of each frame in the layout is a function of the selected position $Y_u$.

A layout may comprise one or more frames displaying, at any time, the loudest participant (also referred to as VOICE SWITCHED). When a frame is VOICE SWITCHED, the audio streams from all the sites are monitored and analyzed. The video conference stream originating from a site having the highest level audio is selected to be displayed in the VOICE SWITCHED frame. Other parameters may influence the selection, e.g., did the audio from a site have the highest level for more than a predetermined period of time.

In one embodiment, the method further comprises the step of determining the loudest speaker, and if the selected layout type comprises a VOICE SWITCHED frame, generating a layout each time a new site becomes the site with the loudest speaker, wherein the identified video conference stream is positioned in the VOICE SWITCHED frame. This step may e.g., include receiving an input from appropriate circuitry such as an audio analyzing unit included in a video conference endpoint. The input identifies the video conference stream identified as the loudest speaker. The layout is sent to the video composing unit.

In another embodiment of the present disclosure, if the selected layout comprises a VOICE SWITCHED frame, the method further comprises the step of generating a layout specifying which frame is VOICE SWITCHED. In this embodiment, the video composing unit, or appropriate circuitry such as an audio analyzing unit included in a unit hosting the video composing unit, analyzes the audio from all the sites and determines which video conference stream to display in the VOICE SWITCHED frame.

The method as described in the present disclosure may be performed by a processing device (or processing unit) included in an endpoint. More specifically, the method may be implemented as a set of processing instructions or computer program instructions, which may be tangibly stored in a memory or on a medium. The set of processing instructions is configured so as to cause an appropriate device, in particular an endpoint (or video conferencing device), to perform the described method when the instructions are executed by a processing device included in the endpoint (or video conferencing device).

Figure 3:
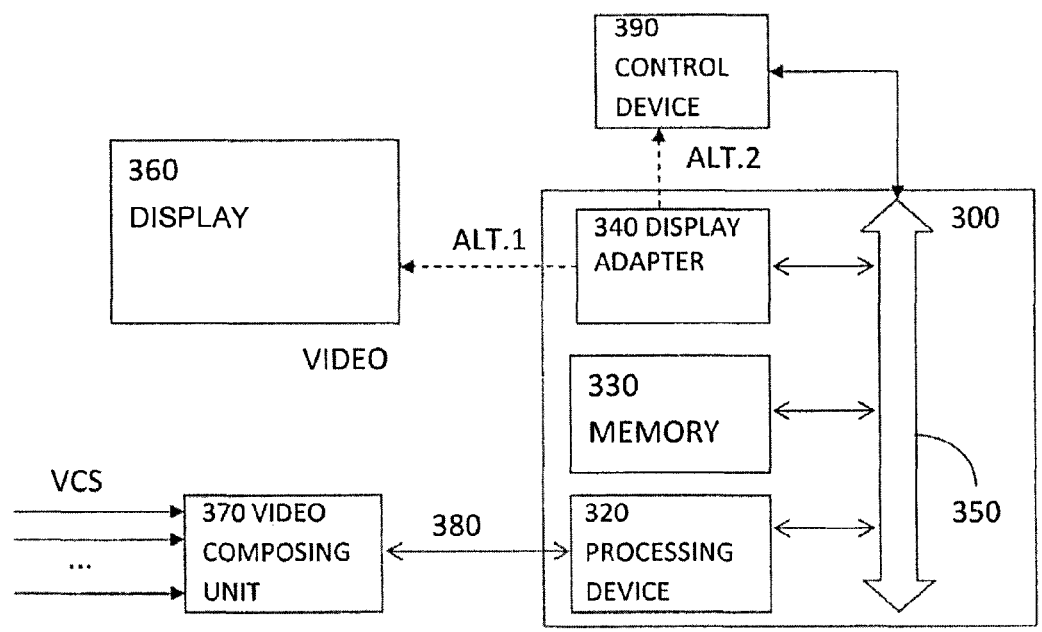
FIG. 3 is a schematic block diagram illustrating one embodiment of the present disclousre.

FIG. 3 is a schematic block diagram illustrating an endpoint 300, in particular a video conferencing endpoint, which is configured to operate in accordance with the method described above. The video conferencing endpoint (or video conferencing device) comprises a processing device (or processing unit) 320, a memory 330, and a display adapter 340, all interconnected via an internal bus 350. The video conferencing endpoint 300 (or video conferencing device) may also include a display device 360, which may include a set of display screens, such as two or three adjacent displays.

The endpoint 300 is connected to a video composing unit 370 via a communication link 380. The video composing unit 370 receives one or more video conference streams from each of a plurality of endpoints connected in a conference, and, based on a selected layout, the image composing unit 370 composes a composite video signal.

Figure 4:
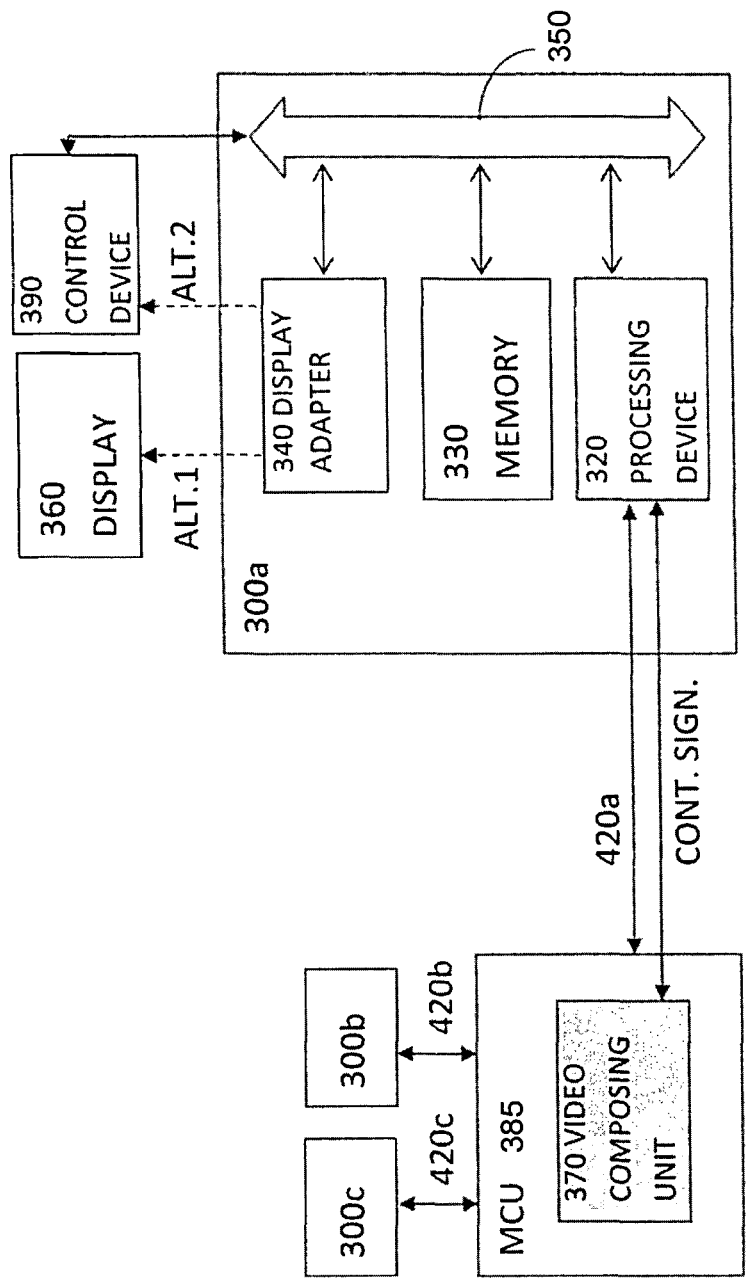
FIG. 4 is a schematic block diagram illustrating one embodiment of the present disclousre.

According to one embodiment of the present disclosure, the video composing unit 370 is part of a network device, such as a centralized Multipoint Control Unit (MCU) 385, as shown in FIG. 4. The video composing unit 370 may also be part of an MCU embedded in the endpoint 300 (not shown). According to this embodiment the MCU 385 receives video conference streams from three or more endpoints 300a-c connected in a conference over communication links 420a-c. The video conference streams from the endpoints 300a-c are sent to a Video Processing Unit (VPU) (not shown), where the video conference streams are decompressed, and the decompressed video conference streams are made available to the video composing unit 370, e.g., via an internal bus or a memory.

The video composing unit 370 spatially mixes one or more of the decompressed video conference streams into one composite video signal, and the composite video signal is made available to the VPU, e.g., via an internal bus or a memory. The VPU compresses the composite video conference stream, and a single composite video conference stream is sent back to one or more of the endpoints 300a-c over respective communication links 420a-c, where the composite video conference stream is decoded and displayed on display 360. A layout is used by the video composing unit 370 to compose the composite video signal.

Figure 5:
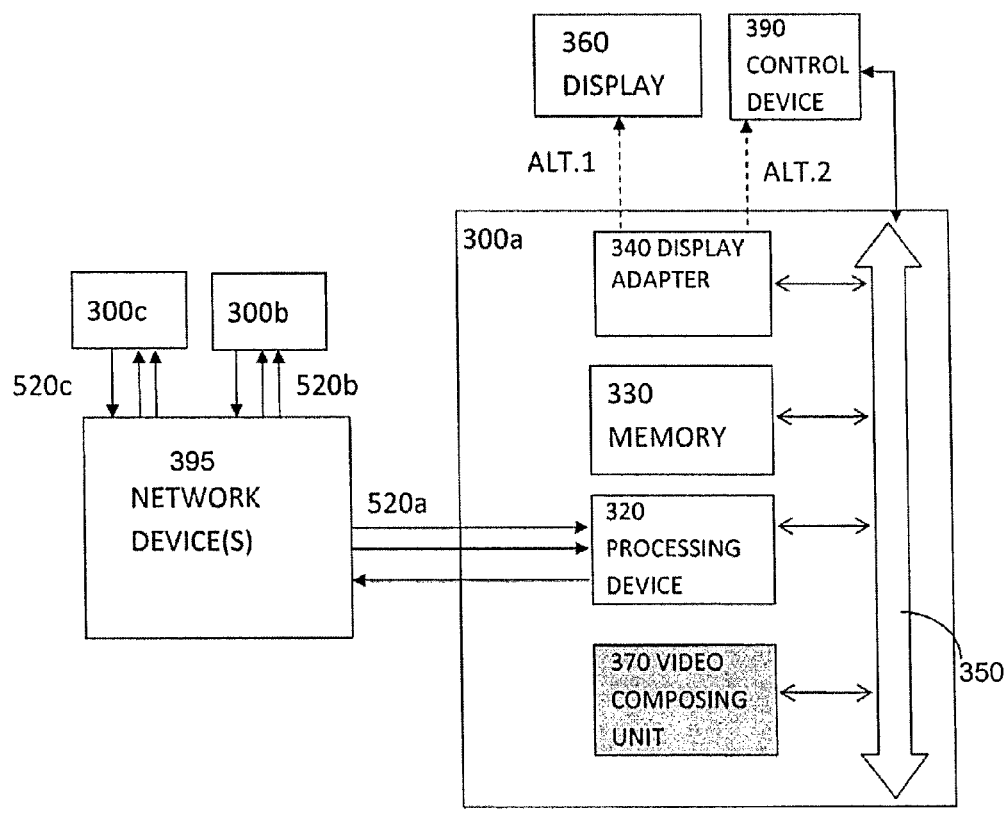
FIG. 5 is a schematic block diagram illustrating one embodiment of the present disclousre.

According to another embodiment of the present disclosure, the video composing unit 370 is part of an endpoint 300a, as shown in FIG. 5, wherein the endpoint 300a receives video conference streams from two or more remote sites 300b-c in a video conference over respective communication links 520a-c. The video conference streams may be transmitted to/from the endpoints 300a-c via one or more network device(s) or unit(s) 395, such as a video conference switch, or the endpoints 300a-c may establish separate point to point sessions between each other. According to this embodiment the endpoint 300a receives one or more video conference streams from each of the two or more endpoints 300b-c connected in a conference.

The video conference streams from the endpoints 300b-c are sent to the processing device 320 where the video conference streams are decompressed, and the decompressed video conference streams are made available to the video composing unit 370, e.g., via an internal bus or a memory. The video composing unit 370 spatially mixes one or more of the decompressed video conference streams into one composite video conference stream, and the composite video conference stream is displayed on a display associated with the endpoint. A layout is used by the video composing unit 370 to compose the composite video conference stream. In this embodiment, the processing device 320 may send the selected or calculated layout to the video composing unit 370 via the internal bus 350.

The illustrated elements of the video conferencing device 300 are shown for the purpose of explaining principles of the embodiments of the present disclosure. Thus, it will be understood that additional elements may be included in an actual implementation of a video conferencing device.

The memory 330 comprises processing instructions which enable the video conferencing device to perform appropriate, regular video conferencing functions and operations. Additionally, the memory 330 comprises a set of processing instructions as described above with reference to the method illustrated in FIG. 1, resulting in that the processing device 320 causes the video conferencing device 300 to perform the presently disclosed method for displaying an image when the processing instructions are executed by the processing device 320.

Figure 6:
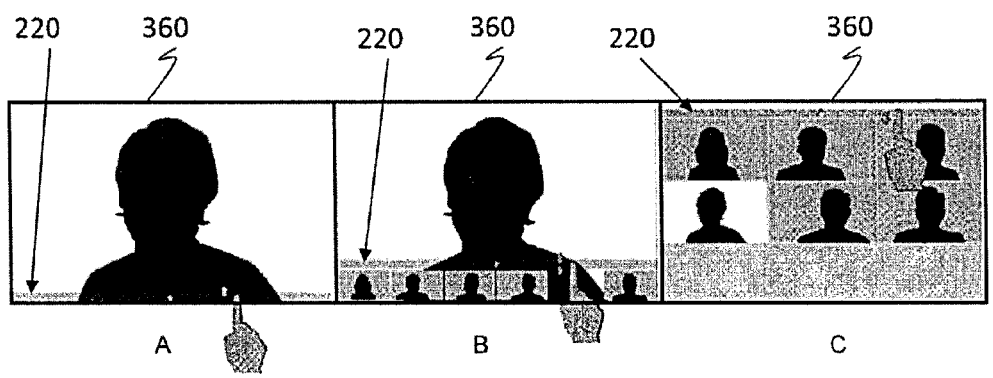
FIG. 6 illustrates display area(s) according to one embodiment of the present disclosure.

FIG. 6 illustrates examples of display area(s) according to the present disclosure. A display screen 360 included in or connected to an endpoint, or on a display control device 390 connected to the endpoint, is arranged in front of a local conference participant (or user). The local participant is conducting a video conference call (such as a multi-site call) with a plurality of remote sites. For illustrative purposes, only six conference participants have been illustrated. However, it is to be understood that there may be any number of conference participants. For simplicity, only one display 360 has been illustrated. However, it is to be understood that an endpoint may have two or more displays.

In FIG. 6A, the local user is receiving a composite video signal. The object 220 is in a position $Y_u$ within a first interval $Z_1$, which, in this example, is associated with a FOCUS layout, and hence the composite video signal is composed based on the FOCUS layout, meaning that only the participant speaking is shown on the entire display area. When a user wishes to change the layout of the composite image, the user can move the object 220 along an axis 230. As noted above, this controls the relative size between the media object that is currently in focus (e.g., active speaker or presentation) and the remaining media objects. The axis 230 itself is not visible, but the shape of the object 220 may be formed to make it clear to a user in which direction the object 220 can be moved.

For illustrative purposes, the display 360 is a touch display, so the user may move the object 220 directly with a finger, as shown in FIGS. 6A-6C. Other input devices may be used to move the object 220.

As shown in FIG. 6B, as the object is moved into position $Y_u$ within a second interval $Z_2$, which, in this example, is associated with a FOCUS+PRESENCE layout, the composite video signal changes into a composite video signal composed based on the FOCUS+PRESENCE layout. As shown in FIG. 6C, as the object is moved into position $Y_u$ within a third interval $Z_3$, which, in this example, is associated with a OVERVIEW layout, the composite video signal changes into a composite video signal composed based on the OVERVIEW layout. As noted above and as shown in FIG. 6C, the OVERVIEW layout shows all video conference streams in equal size.

According to another embodiment of the present disclosure shown in FIG. 7A, the local user is in a conference call with a plurality of remote sites (in this example, 8) and is receiving a composite video signal. The object 220 is in a position $Y_u$ within a first interval $Z_1$, which is associated with a FOCUS layout, as discussed above. As shown in FIG. 7B, as the object is moved into position $Y_u$ within a second interval $Z_2$, which is associated with e.g., a FOCUS+PRESENCE layout, the composite video signal changes into a composite video signal composed based on the FOCUS+PRESENCE layout.

As shown in FIG. 7C, as the object is moved further along the axis within the second interval $Z_2$, the size of frames 730 changes accordingly. The size and position of the frames 730 is a function of the position $Y_u$ within an interval $Z_N$. As the size of the frames 730 increases, less frames may be fitted at the bottom of the screen. Hence, participants 740A and 740F are no longer displayed in the composite video signal. Which of the participants 740A-740F are to be displayed in the frames 730 may be e.g., determined by voice switching (the five most recent speaking participants are displayed). As shown in FIG. 7D, as the object 220 is moved further along the axis within the second interval $Z_2$, the size of the frames 730 changes accordingly. As the object 220 is moved into a position $Y_u$ within a third interval $Z_3$, which is associated with a 2×2 OVERVIEW layout, the composite video signal changes into a composite video signal composed based on the 2×2 OVERVIEW layout, as shown in FIG. 7E. And finally, as the object 220 is moved into a position $Y_u$ within a forth interval $Z_4$, which is associated with a 3×3 OVERVIEW layout, the composite video signal changes accordingly, as shown in FIG. 7F. The third and fourth intervals may also be referred to as sub-intervals $X_M$ or an interval $Z_N$, since the layouts in the third and fourth intervals are variations of a layout.

Figure 8:
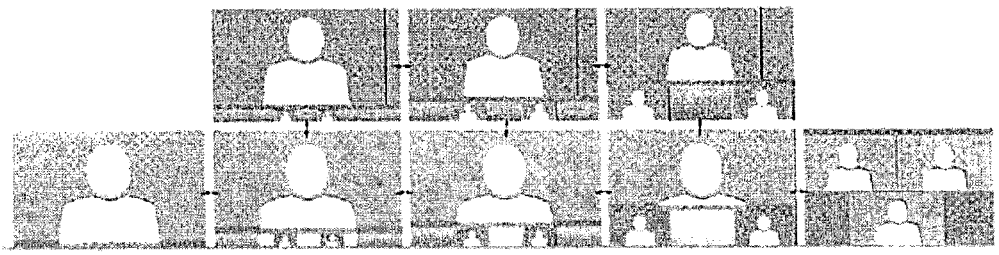
FIG. 8 illustrates display area(s) according to one embodiment of the present disclosure.

In one embodiment, a threshold value $P_{th}$ may be provided on the axis 230. When the object 220 is moved across the threshold value $P_{th}$, the layout changes from a picture-in-picture (PIP) mode to a picture-outside-picture (POP) mode, or vice versa. Alternatively, a user action switches the layout between PIP and POP, as is illustrated in FIG. 8. The user action may be a double tap/click with an input device, or a button in the Graphical User Interface (GUI) or on a remote control being pressed. PIP is, as shown in FIGS. 7B-7D, when the video conference streams in the frames 730 are displayed on top of another video conference stream, while POP is when one or more video conference streams is overlaying another.

Figure 9:
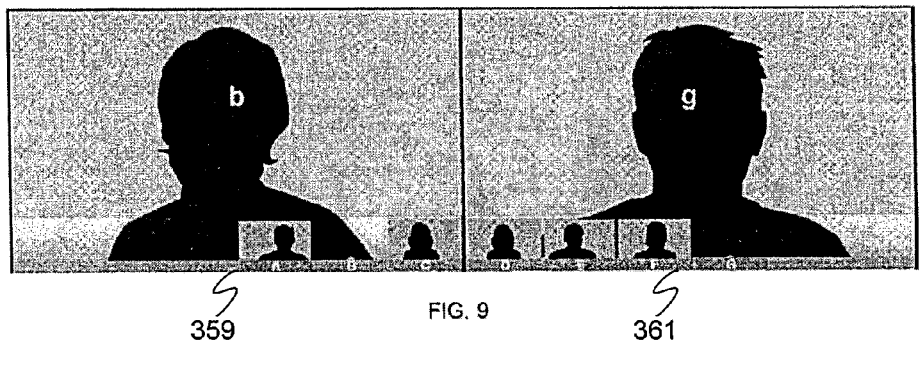
FIG. 9 illustrates displays according to one embodiment of the present disclosure.
Figure 10:
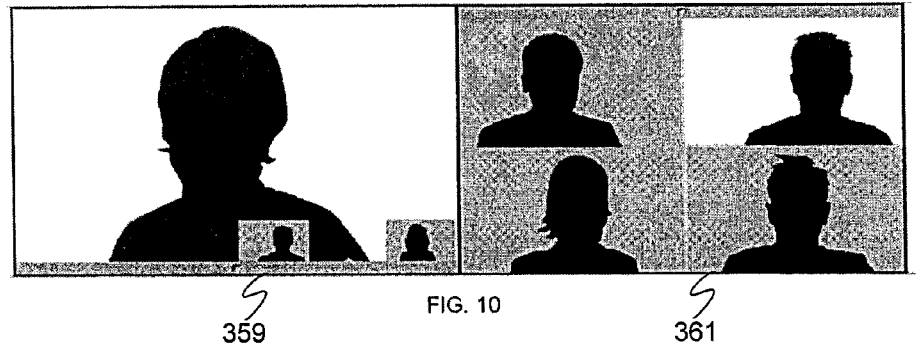
FIG. 10 illustrates displays according to one embodiment of the present disclosure.

The above-discussed embodiments have been described for an endpoint with one main display 360. However, it should be noted that the above-discussed embodiments can be applied to endpoints having a plurality of displays. FIGS. 9 and 10 illustrate examples where endpoints have two displays 359 and 361, and where the layout on the two screens may be controlled dependently (FIG. 9) or independently (FIG. 10) of one another, using the method of the present disclosure.

Moreover, as can be seen on display 359 of FIG. 9, participant "B" is shown in full screen as "b," and thus participant "B" is not shown on the bottom of display 359 in the area between participant "A" and participant "C." As a result, this area may remain empty and/or partly or totally transparent. Similarly, on display 361 of FIG. 9, participant "G" is shown in full screen as "g." This concept, which allows the user to see which of the participants is shown in full screen, is also applied to, for example, the concepts discussed with respect to FIGS. 6 and 10 of the present disclosure.

Figure 11:
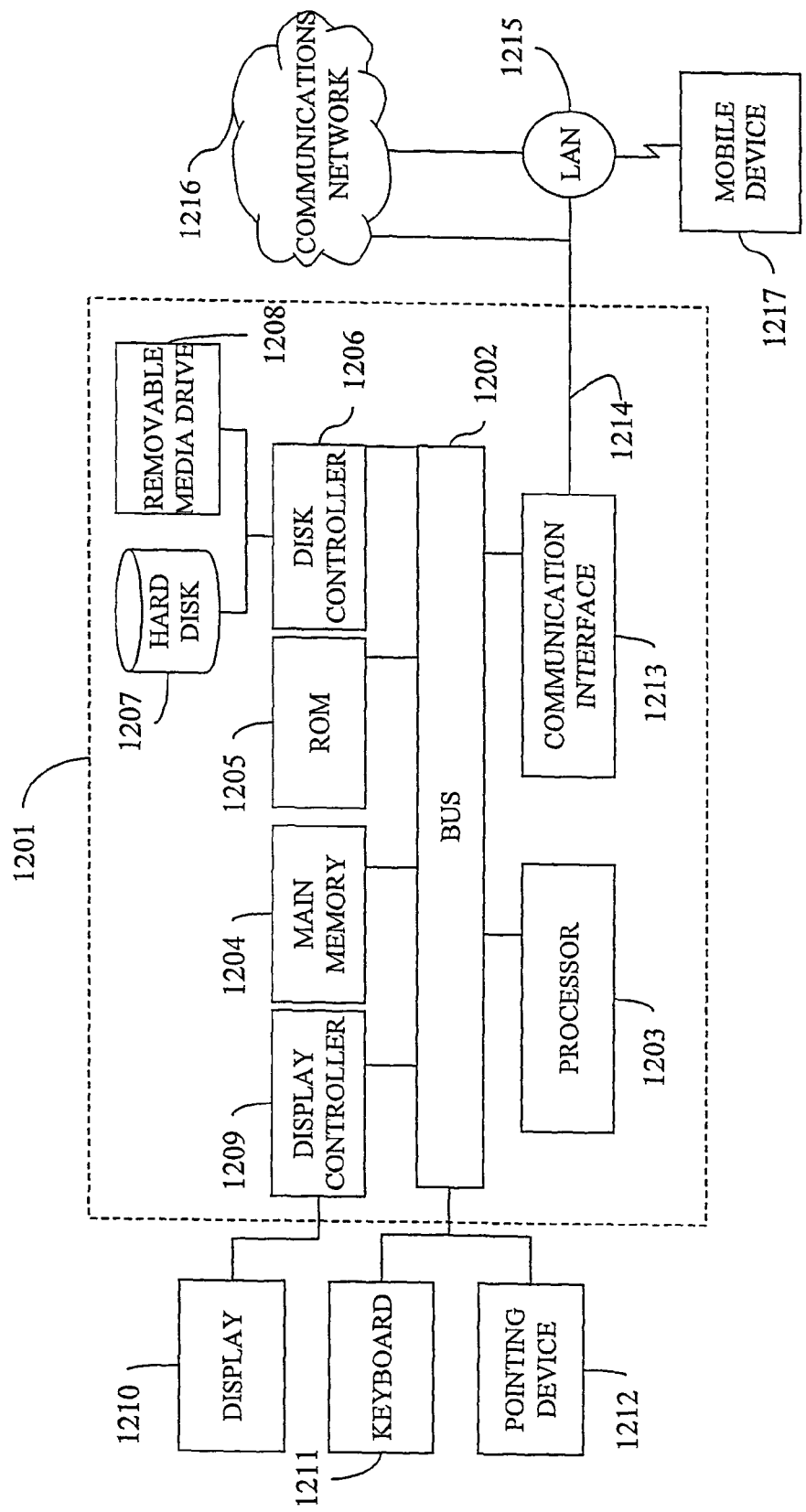
FIG. 11 illustrates a computer system upon which an embodiment of the present disclosure may be implemented.

Various components of the video conferencing endpoint or video conferencing device 300 described above can be implemented using a computer system or programmable logic. FIG. 11 illustrates a computer system 1201 upon which embodiments of the present disclosure may be implemented. The computer system 1201 may include the various above-discussed components with reference to FIGS. 3-5, which perform the above-described process.

The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 (or display adapter 340) coupled to the bus 1202 to control a display 1210 (or display 360) such as a liquid crystal display (LCD), for displaying information to a computer user. The computer system includes input devices, such as a keyboard 1211 and a pointing device 1212, for interacting with a computer user and providing information to the processor 1203 (or processing device/unit 320). The pointing device 1212, for example, may be a mouse, a trackball, a finger for a touch screen sensor, or a pointing stick for communicating direction information and command selections to the processor 1203 and for controlling cursor movement on the display 1210.

The computer system 1201 performs a portion or all of the processing steps of the present disclosure in response to the processor 1203 executing one or more sequences of one or more instructions contained in a memory, such as the main memory 1204 (or memory 330). Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method comprising:
providing, on a display, an object configured to be moved by a user along an axis extending across video for a plurality of video conference streams;
associating a plurality of predefined layouts for plurality of video conference streams with respective intervals along the axis;
detecting a user action on the object indicating a position on the axis; and composing, in response to the detecting of the user action, a composite video signal using a layout, of the plurality of predefined layouts, associated with an interval among the intervals within which the position is lying.

2. The method according to claim 1, wherein
the composite video signal includes a spatial mix of the plurality of video conference streams, and
the layout defines one or more frames for containing the plurality of video conference streams,
the method further comprising:
providing, for at least one of the intervals, a relationship between positions within the at least one of the intervals and a size and position of one or more frames of a respective layout associated with the interval, and
calculating, in response to the detecting of the user action, a layout wherein the size and position of each frame of the layout is based on the relationship and the position.

3. The method according to claim 1, further comprising:
associating M numbers of variations of one of the plurality of predefined layouts with M number of sub-intervals within one or more of the intervals;
identifying, in response to the detecting of the user action, a sub-interval among the sub-intervals within which the position is lying;
selecting a layout, of the plurality of predefined layouts, associated with the sub-interval; and
composing the composite video signal using the selected layout.

4. The method of claim 1, further comprising:
identifying the interval among the intervals within which the position is lying.

5. The method of claim 1, further comprising:
wherein
the composite video signal includes a spatial mix of one or more video conference streams, and
the layout defines one or more frames for containing the video conference streams.

6. The method of claim 5, further comprising:
providing, for at least one of the intervals, a relationship between positions within the at least one of the intervals and the size and position of one or more frames of a respective layout associated with the interval.

7. The method of claim 6, further comprising:
calculating a layout wherein the size and position of each frame of the layout is based on the relationship and the position.

8. The method of claim 1, further comprising:
providing, for at least one of the intervals, a relationship between positions within the at least one of the intervals and the size and position of one or more frames of a respective layout associated with the interval.

9. The method of claim 1, further comprising:
calculating, in response to the detecting of the user action, a layout wherein a size and position of each frame of the layout is based on the relationship and the position.

10. A method comprising:
providing, on a display, an object configured to be moved by a user along an axis;
associating a plurality of predefined layouts with respective intervals along the axis;
detecting a user action on the object indicating a position on the axis;
identifying an interval among the intervals within which the position is lying;
selecting the layout associated with the interval; and composing, in response to the detecting of the user action, a composite video signal using the layout, of the plurality of predefined layouts, associated with the interval among the intervals within which the position is lying.

11. The method according to claim 10, further comprising:
providing the selected layout to a video composing unit, which composes the composite image and which is configured to receive a plurality of video conference streams and output a composite video signal comprising one or more of the received video conference streams based on a layout.

12. The method according to claim 10, further comprising:
displaying the composite video signal on the display, the display being of a video conference terminal.

13. The method according to claim 12, further comprising:
displaying the object on a display of a control device, which is connected to the video conference terminal, together with a replica of the composite video signal currently displayed on the display of the video conference terminal.

14. The method according to claim 10, further comprising:
displaying the object on the display, which is of a video conference terminal.

15. The method according to claim 13, further comprising:
updating one of the composite video signal and the replica in real time as the object is moved by the user.

16. A non-transitory computer-readable storage medium including computer executable instructions, wherein the instructions, when executed by a computer, cause the computer to perform a method, the method comprising:
providing, on a display, an object configured to be moved by a user along an axis;
associating a plurality of predefined layouts with respective intervals along the axis;
detecting a user action on the object indicating a position on the axis;
selecting a layout, of the plurality of predefined layouts, associated with an interval among the intervals within which the position on the axis is lying; and
composing, in response to the detecting of the user action, a composite video signal using the layout, of the plurality of predefined layouts, associated with the interval among the intervals within which the position on the axis is lying.

17. An apparatus comprising:
a processing unit configured to
provide, on a display, an object configured to be moved by a user along an axis,
associate a plurality of predefined layouts with respective intervals along the axis, and
detect a user action on the object indicating a position on the axis; and
a video composing unit configured to compose, in response to the user action being detected by the processing unit, a composite video signal using a layout, of the plurality of predefined layouts, associated with an interval among the intervals within which the position is lying, wherein the processing unit is further configured to
identify an interval among the intervals within which the position is lying,
select the layout associated with the interval, and
provide the selected layout to the video composing unit.

18. The apparatus according to claim 17, wherein
the composite video signal includes a spatial mix of one of more video conference streams,
the layout defines one or more frames for containing the video conference streams, and
the processing unit is further configured to provide, for at least one of the intervals, a relationship between positions within the at least one of the intervals and a size and position of one or more frames of a respective layout associated with the interval, and calculate, in response to the user action being detected, a layout wherein the size and position of each frame of the layout is based on the relationship and the position.

19. The apparatus according to claim 17, wherein the processing unit is further configured to associate M numbers of variations of one of the plurality of predefined layouts with M number of sub-intervals within one or more of the intervals, identify, in response to the user action being detected, a sub-interval among the sub-intervals within which the position is lying, and select a layout, of the plurality of predefined layouts, associated with the sub-interval; and the video composing unit is configured to compose the composite video signal using the selected layout.

* * * * *